(12) United States Patent
McGowan

(10) Patent No.: US 8,203,595 B2
(45) Date of Patent: Jun. 19, 2012

(54) METHOD AND APPARATUS FOR ENABLING IMPROVED EYE CONTACT IN VIDEO TELECONFERENCING APPLICATIONS

(75) Inventor: James William McGowan, Readington, NJ (US)

(73) Assignee: Alcatel Lucent, Paris (FR)

( * ) Notice: Subject to any disclaimer, the term of this patent is extended or adjusted under 35 U.S.C. 154(b) by 465 days.

(21) Appl. No.: 12/454,717

(22) Filed: May 21, 2009

(65) Prior Publication Data
US 2010/0295920 A1     Nov. 25, 2010

(51) Int. Cl.
*H04N 7/14*     (2006.01)
(52) U.S. Cl. .................................. 348/14.16; 348/14.01
(58) Field of Classification Search .............. 348/14.16, 348/14.01, 14.08
See application file for complete search history.

(56) References Cited

U.S. PATENT DOCUMENTS 5,612,733 A * 3/1997 Flohr .......................... 348/14.16
2008/0019661 A1 * 1/2008 Obrador et al. ................ 386/52
2009/0278913 A1 * 11/2009 Rosenfeld et al. ......... 348/14.16

OTHER PUBLICATIONS

Junguk Cho et al., "FPGA-Based Face Detection System Using Haar Classifiers", *FPGA'09*, Feb. 22-24, 2009, Monterey, CA USA, pp. 103-111.

* cited by examiner

*Primary Examiner* — Stella Woo
(74) *Attorney, Agent, or Firm* — Harness, Dickey & Pierce

(57) ABSTRACT

A method and apparatus for displaying images for use during a video teleconference provides improved eye contact between the participants. A video camera mounted on a display (e.g., a monitor or laptop) is co-located with a first participant in the video teleconference. An image of a second participant in the video teleconference is received, and a location of one or more facial features (e.g., the eyes) contained in the image of the second participant is determined. Then, the image of the second participant is displayed on the screen such that the eyes of the second participant are displayed in close proximity to (e.g., directly below) the video camera. In this manner, improved eye contact between the participants is advantageously provided. Alternatively, metadata representing the location of such facial features (e.g., the eyes) contained in the image of the second participant is received along with the image of the second participant.

22 Claims, 7 Drawing Sheets

METHOD AND APPARATUS FOR ENABLING IMPROVED EYE CONTACT IN VIDEO TELECONFERENCING APPLICATIONS

FIELD OF THE INVENTION

The present invention relates generally to the field of video teleconferencing systems and more particularly to a method and apparatus for enabling improved eye contact for participants thereof.

BACKGROUND OF THE INVENTION

Video teleconferencing systems, such as, for example, PC-based systems, are becoming ubiquitous for both business and personal applications. However, such systems do not typically allow for natural eye contact between the participants, because of the angle between the camera, the user, and the video image on the monitor. Most commonly, a camera is placed on top of a monitor or off to its side, but the user is looking squarely into the center of the monitor—disadvantageously, rotated an angle of anywhere from 20 to 70 degrees from the camera lens. This is a broadly acknowledged problem in the video teleconferencing field, and a weakness in essentially all prior art telepresence (e.g., video teleconferencing) systems. In particular, eye contact has been flagged as a key differentiator for a telepresence system, and is a critical element of widespread acceptance of video telephony.

Prior art solutions vary in complexity and effectiveness. For example, certain "high-end" telepresence systems partially solve this problem by placing cameras in the center of a large screen, giving a small region of small angular error, resulting in a small region where eye contact appears to work well. However, this only applies to the few participants in the central area of the teleconferencing system, and only if they must look sideways across the cameras to the far side (e.g., if they are slightly left of their own camera, and their counterpart appears slightly to the right of the same camera, for a symmetrical system). This solution obviously isn't tenable for smaller, single monitor systems with participants closer to the screen and camera. This solution also has quirky glitches—it is often the case that the two participants will report good eye contact, but the other participants in the conference do not see these two participants as looking at each other. For example, person A may be addressing person B on the right of person C, and person B may perceive that fact, but person C will perceive that person A is addressing someone to the left of person C.

Several groups have attempted to develop algorithms that capture a person's head from multiple camera angles, construct a 3D model thereof, and then project that 3D model back to a 2D model with the necessary adjustment to redirect the gaze. Obviously, this approach requires substantial processing and is currently somewhat error prone. In addition, there are complex lighting issues involved with this approach.

Still other prior art systems use an avatar approach, in which a person's head position is captured during a calibration stage, the angular error is removed and coordinates of the head's position are transmitted as they change over time. This head position is used to draw an avatar representing the talker. Unfortunately, it is beyond the current state-of-the-art to use this information to control a realistic-looking avatar of the speaker, or to accurately capture his or her facial movements well. Current systems and those in the foreseeable future work around this by using "cartoon" style or fanciful pictures of the speaker. Although this approach gives a gross sense of the speaker's body gestures, it doesn't provide real eyes to make contact with, and any subtle, and many not-so-subtle, gestures are lost.

Finally, there have been prior art attempts to physically place the light-sensitive camera elements between the pixels of a monitor, forming a camera-monitor hybrid. However, these approaches suffer a geometry problem of their own. The photosensors take up space, and that space comes at the price of gaps in the display. Spreading the sensors out reduces the amount of light available to each sensor, making sufficient lighting a difficult problem to solve. Moreover, even if this approach can be successfully implemented, which is by no means guaranteed, users will be required to purchase a new monitor, laptop or mobile phone, and there will likely be significant video quality and/or camera quality trade-offs.

SUMMARY OF THE INVENTION

The instant inventor has recognized that, since the problem is the angle between a person's gaze and the camera, and since the camera cannot be easily moved to the center of the screen, it would be highly advantageous to move the image on the screen toward the camera (e.g., to be in close proximity thereto). As such, in accordance with an illustrative embodiment of the present invention, rather than drawing the image of a participant centered on the screen (as is typical), the image is advantageously raised (assuming that the camera is on top of the monitor, as is typical) so as to place the camera directly above the eyes. Although this approach may, in some cases, reduce the amount of the face displayed (e.g., by cutting off the person's forehead), it also advantageously reduces the camera angle to merely a few degrees (depending upon viewer distance and the details of the specific equipment being used).

Note that, in accordance with certain illustrative embodiments of the present invention, the image receiving system may advantageously determine a preferred position for the display by advantageously re-positioning the image received from the far end (i.e., the sending system) as the user moves. In accordance with certain illustrative embodiments of the invention, this may be done by recognizing facial features—such as, for example, the location of the eyes—in the received image, which may be performed using conventional image processing techniques which will be fully familiar to those of ordinary skill in the art. Thus, systems in accordance with the various illustrative embodiments of the present invention can advantageously deliver reasonable eye contact between the participants using otherwise conventional system components (i.e., video monitors and video cameras), and with the use of minimal computational resources.

Specifically, in accordance with one illustrative embodiment of the present invention, a method is provided for displaying images for use during a video teleconference including at least two participants, the method performed by an apparatus comprising at least a video camera and a display device which comprises a display screen, said apparatus being co-located with a first one of said participants in said video teleconference, the method comprising receiving an image of a second one of said participants in said video teleconference therefrom, said image comprising at least a pair of eyes of said second one of said participants in said video teleconference; identifying a location of one or more facial features contained in said image of said second one of said participants in said video teleconference; and displaying, with use of said display device, said image of said second one of said participants in said video teleconference on said display screen, such that said eyes of said second one of said participants in said video teleconference are displayed in close proximity to said video camera.

Similarly, in accordance with another illustrative embodiment of the present invention, a video teleconferencing apparatus is provided for displaying images during a video teleconference including at least two participants, the video teleconferencing apparatus co-located with a first one of said participants in said video teleconference and comprising a receiver, which receives an image of a second one of said participants in said video teleconference therefrom, said image comprising at least a pair of eyes of said second one of said participants in said video teleconference; a processor, which identifies a location of one or more facial features contained in said image of said second one of said participants in said video teleconference; a video camera; and a display device which comprises a display screen, wherein the display device displays said image of said second one of said participants in said video teleconference on said display screen, such that said eyes of said second one of said participants in said video teleconference are displayed in close proximity to said video camera.

Also, in accordance with another illustrative embodiment of the present invention, a method is provided for capturing and transmitting images for use during a video teleconference including at least two participants, the method performed by an apparatus comprising at least a video camera and a processor, said apparatus being co-located with a first one of said participants in said video teleconference, the method comprising capturing an image of said first one of said participants in said video teleconference, said image comprising at least a pair of eyes of said first one of said participants in said video teleconference; determining, with use of the processor, locations of one or more facial features contained in said image of said first one of said participants in said video teleconference; and transmitting, to a second one of said participants in said video teleconference, said image, together with facial feature location metadata, said facial feature location metadata representative of said determined locations of said one or more facial features contained in said image of said first one of said participants in said video teleconference, said image and said facial feature location metadata for use by said second one of said participants in said video teleconference in displaying said image such that said eyes of said first one of said participants in said video teleconference are displayed in close proximity to a video camera used by said second one of said participants in said video teleconference.

And similarly, in accordance with another illustrative embodiment of the present invention, a video teleconferencing apparatus is provided for capturing and transmitting images for use during a video teleconference including at least two participants, the video teleconferencing apparatus co-located with a first one of said participants in said video teleconference and comprising a video camera which captures an image of said first one of said participants in said video teleconference, said image comprising at least a pair of eyes of said first one of said participants in said video teleconference; a processor which determines locations of one or more facial features contained in said image of said first one of said participants in said video teleconference; and a transmitter, which transmits, to a second one of said participants in said video teleconference, said image, together with facial feature location metadata, said facial feature location metadata representative of said determined locations of said one or more facial features contained in said image of said first one of said participants in said video teleconference, said image and said facial feature location metadata for use by said second one of said participants in said video teleconference in displaying said image such that said eyes of said first one of said participants in said video teleconference are displayed in close proximity to a video camera used by said second one of said participants in said video teleconference.

DETAILED DESCRIPTION OF THE PREFERRED EMBODIMENTS

Figure 1:
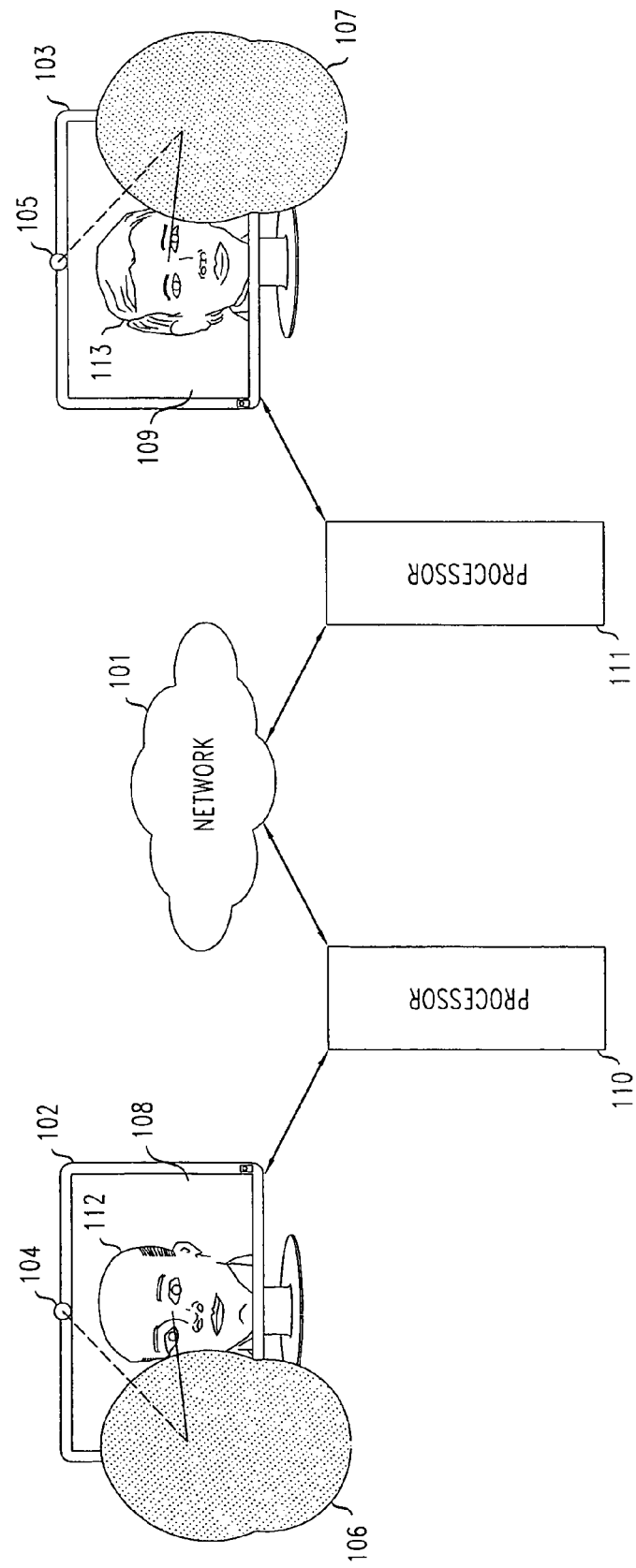
FIG. 1 shows a prior art video teleconferencing environment which includes two participants who are unable to make reasonable eye contact with each other.

FIG. 1 shows a prior art video teleconferencing environment which includes two participants who are unable to make reasonable eye contact with each other. The environment shows a video teleconference between two participants—participant 106 and participant 107. Each participant is using a computer-based teleconferencing system including a processor, a monitor with a video screen, and a video camera. As is typical, for each participant, a conventional (i.e., off-the-shelf) video camera is placed on the top of a video monitor (or, equivalently, a laptop screen), in the left-to-right center of the video screen, and is pointed slightly downward to capture one or more images (e.g., a video) of the participant.

In particular, the computer-based teleconferencing system being used by participant 106 comprises processor 110, video monitor 102 with video screen 108, and video camera 104, while the computer-based teleconferencing system being used by participant 107 comprises processor 111, video monitor 103 with video screen 109, and video camera 105. Specifically, participant 106 is viewing image 112 displayed on video screen 108. Image 112 comprises an image of the face of participant 107, which image has been transmitted from processor 111 (i.e., participant 107's processor) across communications network 101 to processor 110 (i.e., participant 106's processor). However, in accordance with the prior art video teleconferencing environment of FIG. 1, the image is displayed in a portion of the video screen which does not enable participant 106 to simultaneously look at the face of participant 107 (using the solid line of sight shown) and also look into video camera 104 (using the dotted line of sight shown).

Similarly, participant 107 is viewing image 113 displayed on video screen 109. Image 113 comprises an image of the face of participant 106, which image has been transmitted from processor 110 (i.e., participant 106's processor) across communications network 101 to processor 111 (i.e., participant 107's processor). However, in accordance with the prior art video teleconferencing environment of FIG. 1, the image is displayed in a portion of the video screen which does not enable participant 107 to simultaneously look at the face of participant 106 (using the solid line of sight shown) and also look into video camera 105 (using the dotted line of sight shown). Since participant 106 is unable to simultaneously look at the face of participant 107 and also look into video camera 104, and, similarly, participant 107 is unable to simultaneously look at the face of participant 106 and also look into video camera 105, note that the participants in the video teleconference will be unable to make reasonable eye contact with each other.

Figure 2:
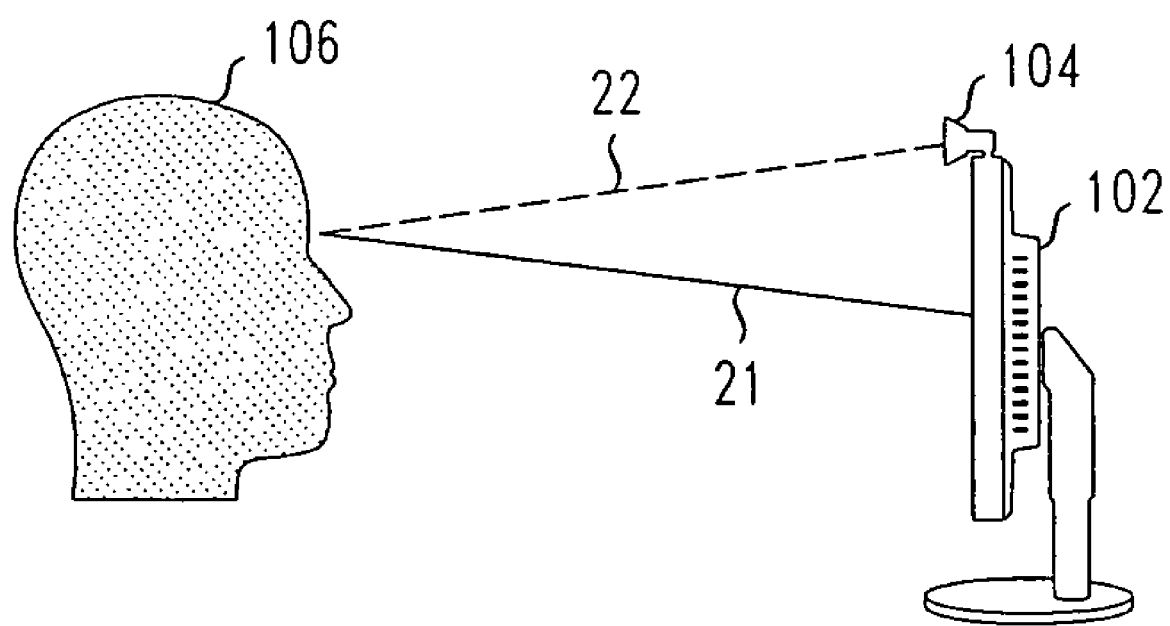
FIG. 2 shows a side view of one of the participants in the prior art video teleconferencing environment of FIG. 1.

FIG. 2 shows a side view of one of the participants in the prior art video teleconferencing environment of FIG. 1. In particular, the figure shows participant 106 using video monitor 102 and video camera 104. As can be seen in the figure, participant 106 is looking at the image displayed on the video screen (which is mounted on video monitor 102) using solid line of sight 21, while video camera 104 is capturing an image of participant 106 (for transmission to another participant) using dotted line of sight 22. Since the image is being displayed in a portion of the video screen which does not enable participant 106 to simultaneously look at the face of the other participant (using solid line of sight 21) and also look into video camera 104 (using dotted line of sight 22), participant 106 and the other participant will be unable to make reasonable eye contact with each other.

Figure 3:
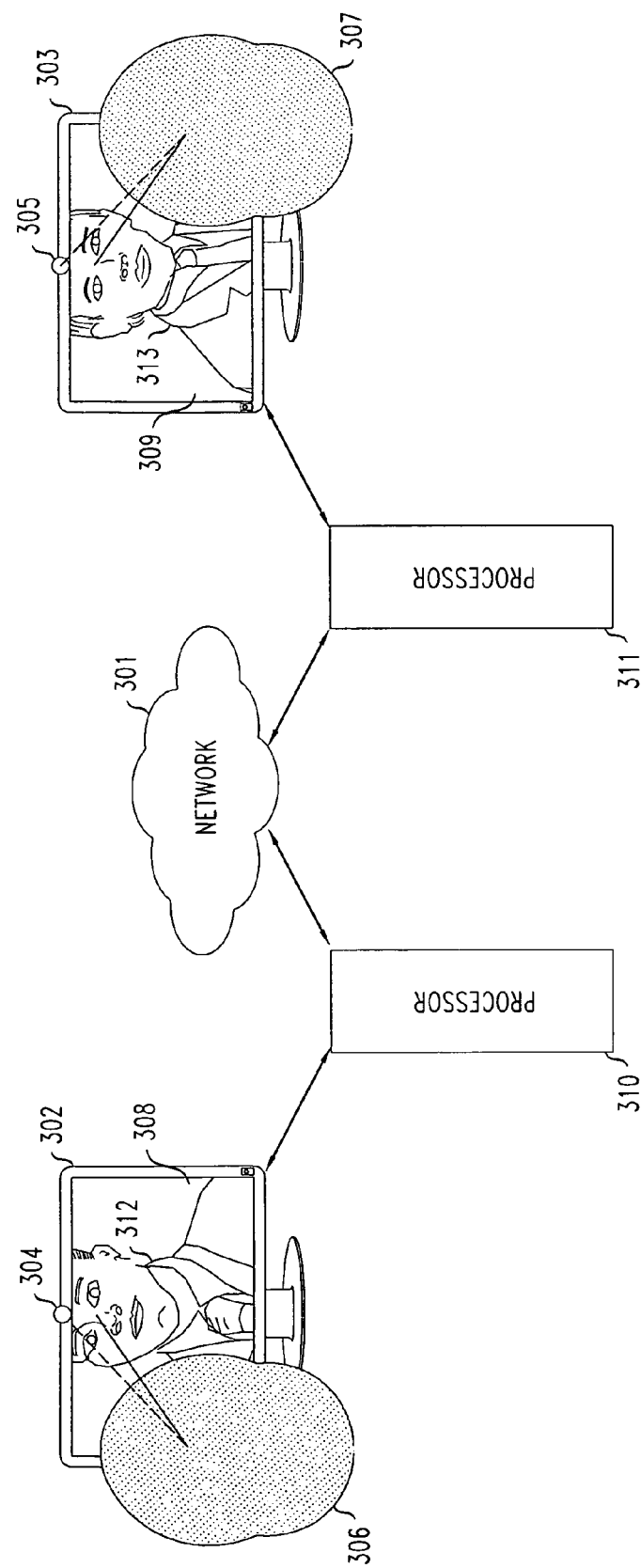
FIG. 3 shows a video teleconferencing environment which advantageously enables improved eye contact between two participants therein in accordance with one illustrative embodiment of the present invention.

FIG. 3 shows a video teleconferencing environment which advantageously enables improved eye contact between two participants therein in accordance with one illustrative embodiment of the present invention. The illustrative environment shows a video teleconference between two participants—participant 306 and participant 307. Each participant is using a computer-based teleconferencing system including a processor, a monitor with a video screen, and a video camera. In accordance with the illustrative embodiment of the present invention shown in FIG. 3, a conventional (i.e., off-the-shelf) video camera is placed on the top of a conventional video monitor (or, equivalently, a laptop screen), in the left-to-right center of the video screen, and is pointed slightly downward to capture one or more images (e.g., a video) of the participant.

In particular, the illustrative computer-based teleconferencing system being used by participant 306 comprises processor 310, video monitor 302 with video screen 308, and video camera 304, while the computer-based teleconferencing system being used by participant 307 comprises processor 311, video monitor 303 with video screen 309, and video camera 305. Specifically, participant 306 is viewing image 312 displayed on video screen 308. Image 312 comprises an image of the face of participant 307, which image has been transmitted from processor 311 (i.e., participant 307's processor) across communications network 301 to processor 310 (i.e., participant 306's processor). However, in accordance with the illustrative video teleconferencing environment of FIG. 3 and in accordance with the illustrative embodiment of the present invention shown therein, the image is advantageously displayed in a portion of the video screen which essentially enables participant 306 to simultaneously look at the face of participant 307 (using the solid line of sight shown) and also look into video camera 304 (using the dotted line of sight shown).

Similarly, participant 307 is viewing image 313 displayed on video screen 309. Image 313 comprises an image of the face of participant 306, which image has been transmitted from processor 310 (i.e., participant 306's processor) across communications network 301 to processor 311 (i.e., participant 307's processor). However, in accordance with the illustrative video teleconferencing environment of FIG. 3 and in accordance with the illustrative embodiment of the present invention shown therein, the image is advantageously displayed in a portion of the video screen which essentially enables participant 307 to simultaneously look at the face of participant 306 (using the solid line of sight shown) and also look into video camera 305 (using the dotted line of sight shown). Since participant 306 is essentially able to simultaneously look at the face of participant 307 and also look into video camera 304, and, similarly, since participant 307 is essentially able to simultaneously look at the face of participant 306 and also look into video camera 305, note that the participants in the video teleconference will advantageously be able to make reasonable eye contact with each other.

Figure 4:
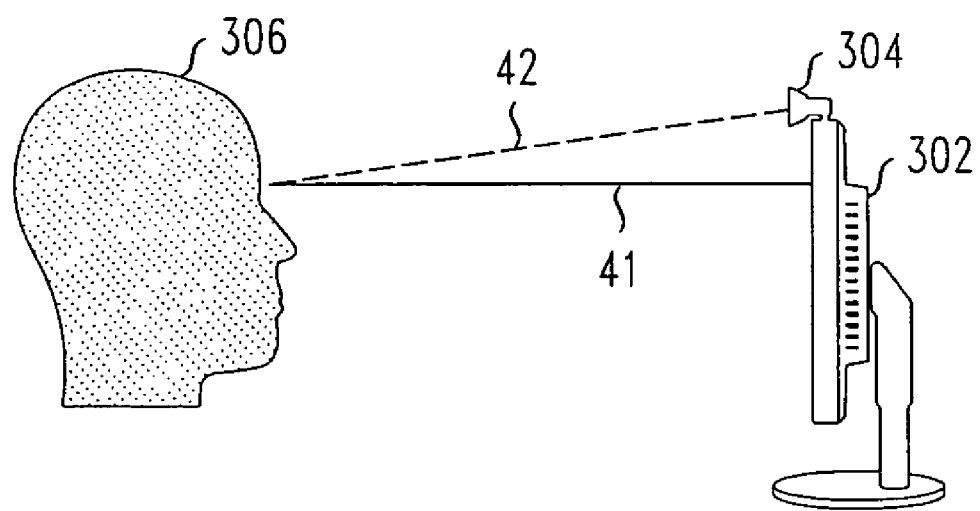
FIG. 4 shows a side view of one of the participants in the illustrative video teleconferencing environment of FIG. 3.

FIG. 4 shows a side view of one of the participants in the illustrative video teleconferencing environment of FIG. 3. In particular, the figure shows participant 306 using video monitor 302 and video camera 304. As can be seen in the figure, participant 306 is looking at the image displayed on the video screen (which is mounted on video monitor 102) using solid line of sight 41, while video camera 304 is capturing an image of participant 306 (for transmission to another participant) using dotted line of sight 42. Since the image is being displayed in a portion of the video screen which essentially enables participant 306 to simultaneously look at the face of the other participant (using solid line of sight 41) and also look into video camera 304 (using dotted line of sight 42), participant 306 and the other participant will advantageously be able to make reasonable eye contact with each other.

As is shown above in connection with FIGS. 3 and 4, and in accordance with various illustrative embodiments of the present invention, each participant's face is advantageously rendered on the other participant's video screen such that the eyes are placed near the top of the screen and thus, directly below the video camera. This may, in accordance with one illustrative embodiment of the present invention, be accomplished automatically with use of conventional eye detection techniques—that is, conventional image analysis algorithms may be used to identify the eyes in an image of a person's face. For example, one such illustrative "eye detector" is based on a cascade of boosted classifiers working with Haar-like features, and is available for the widely used openCV open source computer vision library. (Haar-like features are digital image features used in object recognition and are fully familiar to those of ordinary skill in the art. Similarly, the openCV open source computer vision library, as well as the above-described illustrative "eye detector" included therein, are also fully familiar to those skilled in the art.)

Then, in accordance with such illustrative embodiments of the present invention, the results of such an illustrative eye detector may be advantageously used to place the other participant's eyes at an appropriate position on the video screen (e.g., at the top of the screen, directly below the video camera). In accordance with one illustrative embodiment of the present invention, this may be done solely by the "receiving" video teleconferencing system (e.g., processor 310 and/or processor 311)—that is, the system which receives the image from another participant performs the above-described eye detection procedure and then places the image on the screen such that the eyes are located in close proximity to (e.g., immediately below) the location of the video camera. However, in accordance with another illustrative embodiment of the present invention, a "sending" video teleconferencing system (e.g., processor 310 and/or processor 311) may perform the above-described eye detection procedure on the image it captures with its own video camera, and then transmit both the image itself, as well as certain "metadata" which, for example, specifies the location of the eyes in the image. In this case, the "receiving" video teleconferencing system merely system. And in accordance with yet another illustrative embodiment of the present invention, such eye detection may be performed within the communications network itself, which then sends metadata, which, for example, specifies the location of the eyes in the image, along with the image. Then, in this case, advantageously, neither the sending system nor the receiving system includes its own eye detection capability therein, and the receiving system merely displays the image in accordance with the received metadata as provided by the network.

Figure 5:
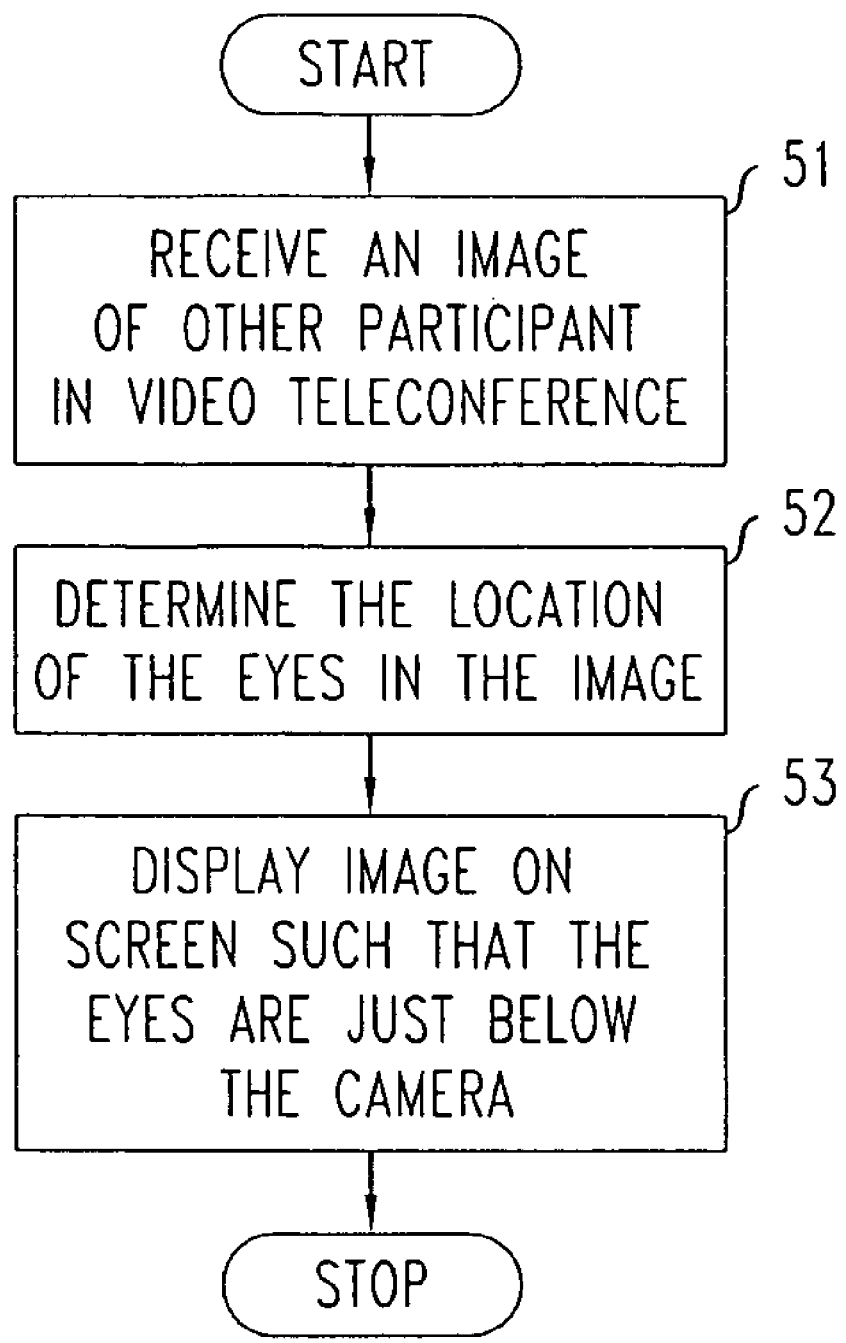
FIG. 5 shows a flowchart of a method for enabling improved eye contact in a video teleconferencing application in accordance with a first illustrative embodiment of the present invention.

FIG. 5 shows a flowchart of a method for enabling improved eye contact in a video teleconferencing application in accordance with a first illustrative embodiment of the present invention. The illustrative method shown in FIG. 5 advantageously employs eye detection at the "receiving" video teleconferencing system, as described above. Specifically, in block 51 of the flowchart, an image of the other participant in the video teleconference is received. Then, in block 52 of the flowchart, eye detection is performed to locate the eyes of the other participant in the image. (See discussion above for illustrative eye detection techniques.) And finally, in block 53 of the flowchart, the image is displayed on the video screen such that the eyes of the other participant are located just below the video camera (e.g., by placing the image such that the eyes are at the top of the video screen).

Figure 6:
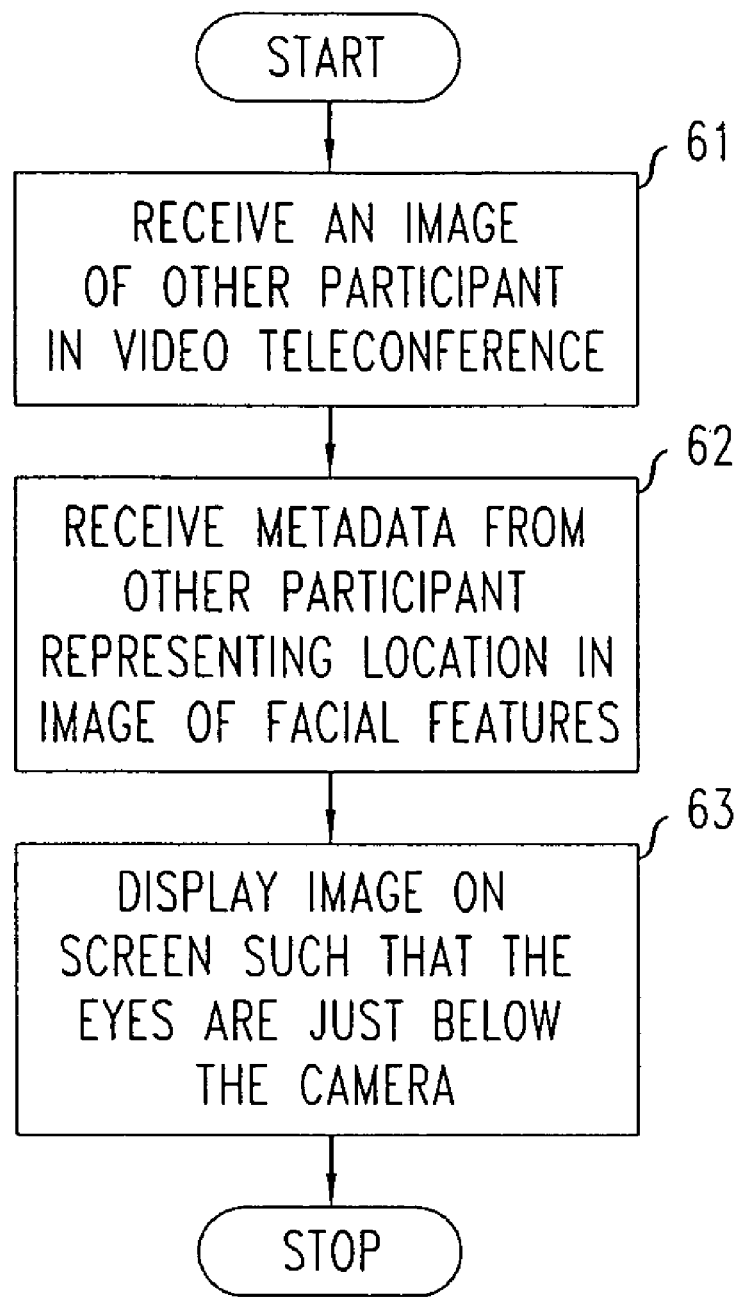
FIG. 6 shows a flowchart of a method for enabling improved eye contact in a video teleconferencing application in accordance with a second illustrative embodiment of the present invention.

FIG. 6 shows a flowchart of a method for enabling improved eye contact in a video teleconferencing application in accordance with a second illustrative embodiment of the present invention. The illustrative method shown in FIG. 6 advantageously makes use of metadata received from either the "sending" video teleconferencing system (as described above) or from the communications network (as also described above). Specifically, in block 61 of the flowchart, an image of the other participant in the video teleconference is received. Then, in block 62 of the flowchart, metadata representing the location in the received image of certain facial features (such as, for example, the location of the eyes) is also received. Illustratively, as explained above, this metadata may have been generated by a "sending" video teleconferencing system (which generated the image of the other participant), or it may have been generated from within the communications network. (Note that if the metadata specifies the location of facial features other than the eyes, the location of the eyes may then be advantageously derived based on the metadata. Illustrative methods for performing such a derivation will be fully familiar to those of ordinary skill in the art.) And finally, in block 63 of the flowchart, the image is displayed on the video screen such that the eyes of the other participant are located just below the video camera (e.g., by placing the image such that the eyes are at the top of the video screen).

Figure 7:
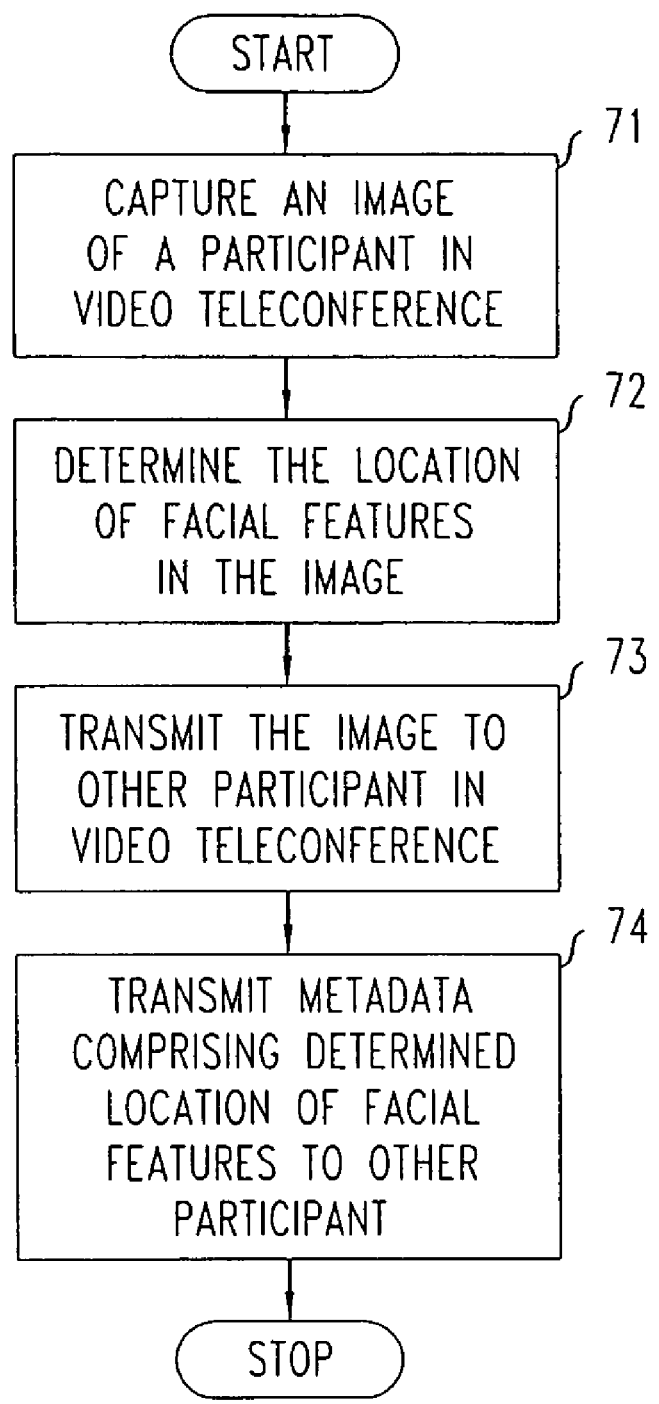
FIG. 7 shows a flowchart of a method for enabling improved eye contact in a video teleconferencing application in accordance with a third illustrative embodiment of the present invention.

FIG. 7 shows a flowchart of a method for enabling improved eye contact in a video teleconferencing application in accordance with a third illustrative embodiment of the present invention. The illustrative method shown in FIG. 7 shows the capturing and transmission of an image by a "sending" video teleconferencing system, and advantageously generates and transmits metadata representing the location in the captured image of certain facial features (such as, for example, the location of the eyes). Specifically, in block 71 of the flowchart, an image of the participant using the given system is captured. Then, in block 72, the location of certain facial features (such as, for example, the location of the eyes) in the captured image is determined. Next, in block 73, the captured image is transmitted to a "receiving" video teleconferencing system, and finally, in block 74, metadata comprising the determined location of the facial features (such as, for example, the location of the eyes) in the captured image is also transmitted to the "receiving" video teleconferencing system.

In accordance with certain illustrative embodiments of the present invention, an image, in addition to being re-positioned (such that it is displayed in close proximity to the video camera) in accordance with the principles of the present invention, may also be cropped, re-sized, and/or translated in order to improve the visual display characteristics thereof. Such image display adjustments may be made based on fully conventional techniques and will be obvious to those of ordinary skill in the art.

Note that in accordance with the illustrative embodiment of the present invention shown in FIG. 3 and described above, both participants advantageously employ the principles of the present invention so as to enable the participants to have reasonable eye contact with each other. However, in accordance with other illustrative embodiments of the present invention, only one participant may employ the techniques of the present invention, and only one participant may enjoy the benefits thereof. For example, in accordance with one such illustrative embodiment of the present invention, the receiving video teleconferencing system (e.g., participant A's system) may perform eye detection on the received image (and then display the received image in close proximity to the video camera), while the sending system (e.g., participant B's system) employs no special equipment or processing at all. In such a case, participant A (i.e., the receiver) will advantageously be able to look at the eyes of participant B (i.e., the sender) while also looking into his or her video camera. Therefore, the image of participant A that is sent back to participant B will advantageously have a nearly correct eye gaze, which benefits participant B (but does not directly benefit participant A).

As such, an illustrative system in accordance with this illustrative embodiment of the present invention altruistically benefits the "far end" (i.e., the "other" participant), without providing any direct benefit to the "near end" (i.e., the user's whose system advantageously employs the techniques of this illustrative embodiment of the present invention). This may, for example, be advantageously employed by sales people and others wishing to make eye contact (from the perspective of the far end participant), while still being able to read the expression of the far end participant. Of course, if both users employ the illustrative system (as shown, for example, in FIG. 3 above), both users benefit from each others' display of their received images in close proximity to their video cameras, and thus, they can advantageously maintain mutual eye contact.

Moreover, in accordance with certain illustrative embodiments of the present invention, other facial feature detectors (rather than eye detectors) may be employed. For example, face detectors, also fully familiar to those skilled in the art, may be used, albeit with somewhat less positional accuracy than is achieved with eye detectors. Similarly, nose detectors, also fully familiar to those skilled in the art, may be used. In general, in accordance with various illustrative embodiments of the present invention, any one or more of a number of (conventional) facial feature detectors, which will be fully familiar to those of ordinary skill in the art, may be employed, and the image may then be advantageously rendered on the video screen based upon one or more of such identified facial features. Also, in accordance with certain illustrative embodiments of the present invention, the location of the eyes may advantageously be indirectly deduced from the identification and/or location of one or more (other) facial features.

In accordance with still other illustrative embodiments of the present invention, multiple participants (e.g., more than two) may be involved in a video teleconference. In such a case, an illustrative system in accordance with the present invention may, for example, place each participant behind a separate video camera, or, alternatively, may identify the current talker and place that participant (only) directly below the (single) video camera for improved eye contact. Alternatively, in accordance with another illustrative embodiment of the present invention, the near end user may advantageously select one participant as the talker, and the image of that participant may be advantageously displayed directly below the (single) video camera for improved eye contact. Numerous such variations involving multiple participants in accordance with various illustrative embodiments of the present invention will be obvious to those of ordinary skill in the art and will be easily implemented thereby.

Finally, with certain minimal physical design changes, in accordance with other illustrative embodiments of the present invention, a video camera may be physically lowered from the top of a video monitor such that it rests, for example, between the eyes of the image of the other participant. Such an illustrative embodiment of the present invention would advantageously allow for virtually error-free eye contact. In addition, in accordance with another illustrative embodiment of the present invention, a fiber optic camera lens extension may be advantageously used, thereby enabling the video camera to placed anywhere on the screen, with minimal intrusion.

Addendum to the Detailed Description

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

A person of ordinary skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods.

The functions of any elements shown in the figures, including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method for displaying images for use during a video teleconference including at least two participants, the method performed by an apparatus comprising a display device which comprises a display screen and a video camera positioned at an edge of said display screen, said apparatus being co-located with a first one of said participants in said video teleconference, the method comprising:

receiving an image of a second one of said participants in said video teleconference therefrom, said image comprising at least a pair of eyes of said second one of said participants in said video teleconference;

identifying a location of one or more facial features contained in said image of said second one of said participants in said video teleconference; and displaying, with use of said display device, said image of said second one of said participants in said video teleconference on said display screen, such that said eyes of said second one of said participants in said video teleconference are displayed in close proximity to said video camera positioned at said edge of said display screen.

2. The method of claim 1 wherein said video camera is physically positioned directly above said display screen and in close proximity thereto, and wherein said displaying said image of said second one of said participants on said display screen such that said eyes of said second one of said participants are displayed in close proximity to said video camera comprises displaying said image at the top of said display screen, such that said video camera is directly above said eyes of said second one of said participants.

3. The method of claim 1 wherein said identifying said location of said one or more facial features contained in said image of said second one of said participants in said video teleconference comprises receiving facial feature location metadata from said second one of said participants in said video teleconference, said facial feature location metadata comprising information representative of said location of said one or more facial features contained in said image of said second one of said participants in said video teleconference.

4. The method of claim 3 wherein said facial feature location metadata comprises information representative of a location of said eyes of said second one of said participants within said image.

5. The method of claim 1 wherein said identifying said location of said one or more facial features contained in said image of said second one of said participants in said video teleconference comprises determining said location of said one or more facial features contained in said image of said second one of said participants in said video teleconference based on an analysis of said image.

6. The method of claim 5 wherein said analysis of said image comprises performing one or more of face location, nose detection and eye detection techniques on said image.

7. The method of claim 1 wherein said displaying said image of said second one of said participants in said video teleconference on said display screen further comprises performing one or more of cropping, re-sizing and translating said image.

8. A method for capturing and transmitting images for use during a video teleconference including at least two participants, the method performed by an apparatus comprising at least a video camera and a processor, said apparatus being co-located with a first one of said participants in said video teleconference, the method comprising:
  capturing an image of said first one of said participants in said video teleconference, said image comprising at least a pair of eyes of said first one of said participants in said video teleconference;
  determining, with use of the processor, locations of one or more facial features contained in said image of said first one of said participants in said video teleconference; and
  transmitting, to a second one of said participants in said video teleconference, said image, together with facial feature location metadata, said facial feature location metadata representative of said determined locations of said one or more facial features contained in said image of said first one of said participants in said video teleconference, said image and said facial feature location metadata for use by said second one of said participants in said video teleconference in displaying said image such that said eyes of said first one of said participants in said video teleconference are displayed in close proximity to a video camera used by said second one of said participants in said video teleconference.

9. The method of claim 8 wherein said facial feature location metadata comprises information representative of a location of said eyes of said first one of said participants within said image.

10. The method of claim 8 wherein said locations of one or more facial features contained in said image of said first one of said participants in said video teleconference are determined based on an analysis of said image.

11. The method of claim 10 wherein said analysis of said image comprises performing one or more of face location, nose detection and eye detection techniques on said image.

12. A video teleconferencing apparatus for displaying images during a video teleconference including at least two participants, the video teleconferencing apparatus co-located with a first one of said participants in said video teleconference and comprising:
  a receiver, which receives an image of a second one of said participants in said video teleconference therefrom, said image comprising at least a pair of eyes of said second one of said participants in said video teleconference;
  a processor, which identifies a location of one or more facial features contained in said image of said second one of said participants in said video teleconference;
  a video camera; and
  a display device which comprises a display screen and a video camera positioned at an edge of said display screen, wherein the display device displays said image of said second one of said participants in said video teleconference on said display screen, such that said eyes of said second one of said participants in said video teleconference are displayed in close proximity to said video camera positioned at said edge of said display screen.

13. The video teleconferencing apparatus of claim 12 wherein said video camera is physically positioned directly above said display screen and in close proximity thereto, and wherein said display device displays said image of said second one of said participants on said display screen such that said eyes of said second one of said participants are displayed in close proximity to said video camera by displaying said image at the top of said display screen, such that said video camera is directly above said eyes of said second one of said participants.

14. The video teleconferencing apparatus of claim 12 wherein said processor identifies said location of said one or more facial features contained in said image of said second one of said participants in said video teleconference by receiving facial feature location metadata from said second one of said participants in said video teleconference, said facial feature location metadata comprising information representative of said location of said one or more facial features contained in said image of said second one of said participants in said video teleconference.

15. The video teleconferencing apparatus of claim 14 wherein said facial feature location metadata comprises information representative of a location of said eyes of said second one of said participants within said image.

16. The video teleconferencing apparatus of claim 12 wherein said processor identifies said location of said one or more facial features contained in said image of said second one of said participants in said video teleconference by determining said location of said one or more facial features contained in said image of said second one of said participants in said video teleconference based on an analysis of said image.

17. The video teleconferencing apparatus of claim 16 wherein said analysis of said image by said processor comprises performing one or more of face location, nose detection and eye detection techniques on said image.

18. The video teleconferencing apparatus of claim 12 wherein said display device displays said image of said second one of said participants in said video teleconference on said display screen after performing one or more of cropping, re-sizing and translating said image.

19. A video teleconferencing apparatus for capturing and transmitting images for use during a video teleconference including at least two participants, the video teleconferencing apparatus co-located with a first one of said participants in said video teleconference and comprising:

a video camera which captures an image of said first one of said participants in said video teleconference, said image comprising at least a pair of eyes of said first one of said participants in said video teleconference;

a processor which determines locations of one or more facial features contained in said image of said first one of said participants in said video teleconference; and a transmitter, which transmits, to a second one of said participants in said video teleconference, said image, together with facial feature location metadata, said facial feature location metadata representative of said determined locations of said one or more facial features contained in said image of said first one of said participants in said video teleconference, said image and said facial feature location metadata for use by said second one of said participants in said video teleconference in displaying said image such that said eyes of said first one of said participants in said video teleconference are displayed in close proximity to a video camera used by said second one of said participants in said video teleconference.

20. The video teleconferencing apparatus of claim 19 wherein said facial feature location metadata comprises information representative of a location of said eyes of said first one of said participants within said image.

21. The video teleconferencing apparatus of claim 19 wherein said locations of one or more facial features contained in said image of said first one of said participants in said video teleconference are determined by said processor based on an analysis of said image.

22. The video teleconferencing apparatus of claim 21 wherein said analysis of said image comprises performing one or more of face location, nose detection and eye detection techniques on said image.

* * * * *